US012561921B2

(12) United States Patent
    Chai et al.

(10) Patent No.: US 12,561,921 B2
(45) Date of Patent: Feb. 24, 2026

(54) SCENE ENCODING FOR MULTI-USER MIXED-REALITY TELEPRESENCE

(71) Applicant: Nokia Solutions and Networks Oy, Espoo (FI)

(72) Inventors: Eugene Chai, Murray Hill, NJ (US); Kittipat Apicharttrisorn, Murray Hill, NJ (US); Sarit Mukherjee, Murray Hill, NJ (US); Limin Wang, Plainsboro, NJ (US); Hyunseok Chang, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 136 days.

(21) Appl. No.: 18/638,144

(22) Filed: Apr. 17, 2024

(65) Prior Publication Data

US 2025/0329117 A1      Oct. 23, 2025

(51) Int. Cl.
    *G06V 20/20*        (2022.01)
    *G06T 19/00*        (2011.01)
            (Continued)

(52) U.S. Cl.
    CPC ............ *G06T 19/006* (2013.01); *G06V 10/25* (2022.01); *G06V 20/20* (2022.01); *H04N 19/132* (2014.11); *G06V 2201/07* (2022.01)

(58) Field of Classification Search
    None
    See application file for complete search history.

(56) References Cited

U.S. PATENT DOCUMENTS

| | | |
|---|---|---|
| 10,757,423 B2 | 8/2020 | Abbas |
| 10,972,768 B2 | 4/2021 | Zou et al. |
| (Continued) | | |

FOREIGN PATENT DOCUMENTS

| | | |
|---|---|---|
| CN | 115426488 A | 12/2022 |
| EP | 3547276 A1 | 10/2019 |

OTHER PUBLICATIONS

Xiang et al., "Pipelined Data-Parallel CPU/GPU Scheduling for Multi-DNN Real-Time Inference", IEEE, 2019. (Year: 2019).*

(Continued)

*Primary Examiner* — Nicholas R Wilson
(74) *Attorney, Agent, or Firm* — Mendelsohn Dunleavy, P.C.; Steve Mendelsohn

(57) ABSTRACT

A scene encoding subsystem for multi-user mixed-reality telepresence has at least one encoder that processes signals from a plurality of cameras. A scene manager determines relative priorities of the cameras and allocates CPU resources and GPU resources in the at least one encoder based on the relative priorities of the cameras, where (i) greater CPU resources are allocated to higher priority cameras than to lower priority cameras and (ii) greater GPU resources are allocated to lower priority cameras than to higher priority cameras. The scene manager instructs a CPU to process a skipped frame using a bounding-box expansion algorithm based on object motion determined using GPU object detection and segmentation processing of previous non-skipped frames. The scene manager multiplicatively decreases and additively increases CPU and GPU resources for a set of multiple cameras based on performance of any one camera in the set.

20 Claims, 10 Drawing Sheets

(51) Int. Cl.
 G06V 10/25 (2022.01)
 H04N 19/132 (2014.01)

(56) References Cited

U.S. PATENT DOCUMENTS

| 11,363,240 | B2 | 6/2022 | Valli |
| 2023/0229282 | A1 | 7/2023 | Reynolds et al. |

OTHER PUBLICATIONS

Choi, Seungbeom, et al. "Serving Heterogeneous Machine Learning Models on Multi-GPU Servers with Spatio-Temporal Sharing." 2022 USENIX Annual Technical Conference. Carlsbad, CA, USA. (2022): 199-216.

Dhakal, Aditya, et al. "GSLICE: Controlled Spatial Sharing of GPUs for a Scalable Inference Platform." Proceedings of the 11th ACM Symposium on Cloud Computing. Virtual Event, USA. (2020): 492-506.

Ghoshal, Moinak, et al. "Performance of Cellular Networks on the Wheels." Proceedings of the 2023 ACM on Internet Measurement Conference. Montreal, QC, Canada (2023): 678-695.

Ginzburg, Samuel, et al. "Serverless Isn't Server-Less: Measuring and Exploiting Resource Variability on Cloud FaaS Platforms." Proceedings of the 2020 Sixth International Workshop on Serverless Computing. Delft, Netherlands (2020): 43-48.

Guan, Yongjie, et al. "MetaStream: Live Volumetric Content Capture, Creation, Delivery, and Rendering in Real Time." Proceedings of the 29th Annual International Conference on Mobile Computing and Networking. Madrid, Spain (2023): 425-439.

Gül, Serhan, et al. "Cloud rendering-based volumetric video streaming system for mixed reality services." Proceedings of the 11th ACM Multimedia Systems Conference. Istanbul, Turkey (2020): 357-360.

Gül, Serhan, et al. "Low-latency cloud-based volumetric video streaming using head motion prediction." Proceedings of the 30th ACM Workshop on Network and Operating Systems Support for Digital Audio and Video. Istanbul, Turkey (2020): 27-33.

Han, Bo, et al. "ViVo: Visibility-aware mobile volumetric video streaming." Proceedings of the 26th Annual International Conference on Mobile Computing and Networking. London, United Kingdom. (2020): 1-13.

Illahi, Gazi Karam, et al. "Foveated Streaming of Real-Time Graphics." Proceedings of the 12th ACM Multimedia Systems Conference. Istanbul, Turkey (2021): 214-226.

Krajancich, Brooke, et al. "Towards attention-aware foveated rendering." ACM Transactions on Graphics (TOG) 42.4 Article 77 (2023): 1-10.

Lawrence, Jason, et al. "Project Starline: a high-fidelity telepresence system." ACM Transactions on Graphics (TOG) 40.6 Article 242 (2021): 1-16.

Liu, Yu, et al. "Vues: Practical Mobile Volumetric Video Streaming Through Multiview Transcoding." Proceedings of the 28th Annual International Conference on Mobile Computing and Networking. Sydney, NSW, Australia. (2022): 514-527.

Natarajan, Prabhu, et al. "Multi-Camera Coordination and Control in Surveillance Systems: a Survey." ACM Transactions on Multimedia Computing, Communications, and Applications (TOMM) 11.4 Article 57 (2015): 1-30.

Pasandi, Hannaneh Barahouei, et al. "CONVINCE: Collaborative Cross-Camera Video Analytics at the Edge." 2020 IEEE International Conference on Pervasive Computing and Communications Workshops (PerCom Workshops). Austin, Texas, USA. (2020): 1-5.

Tursun, Okan Tarhan, et al. "Luminance-Contrast-Aware Foveated Rendering." ACM Transactions on Graphics (TOG) 38.4 Article 98 (2019): 1-14.

Xiang, Donglai, et al. "Dressing Avatars: Deep Photorealistic Appearance for Physically Simulated Clothing ." ACM Transactions on Graphics (TOG) 41.6 Article 222 (2022): 1-15.

Yu, Fuxun, et al. "Automated Runtime-Aware Scheduling for Multi-Tenant DNN Inference on GPU ." 2021 IEEE/ACM International Conference on Computer Aided Design (ICCAD), Munich, Germany (2021): 1-9.

Zhang, Anlan, et al. "YuZu: Neural-Enhanced Volumetric Video Streaming." 19th USENIX Symposium on Networked Systems Design and Implementation Renton, WA, USA. (2022): 137-154.

Zhang, Xiaojie "Resource Management in Mobile Edge Computing for Compute-intensive Application." Dissertation, The City University of New York (2023): 1-185.

Zhang, Letian, et al. "E3 Pose: Energy-Efficient Edge-assisted Multi-camera System for Multi-human 3D Pose Estimation." arXiv preprint arXiv:2301.09015 (2023): 1-13.

Apple Vision Pro, www.apple.com, 2023 [retrieved on Jul. 17, 2024] Retrieved from the Internet: <URL: https://www.apple.com/apple-vision-pro/> (34 pages).

Metaverse Market Forecast, www.gminsights.com, 2022 [retrieved on Jul. 17, 2024] Retrieved from the Internet: <URL: https://www.gminsights.com/industry-analysis/metaverse-market> (8 pages).

Draco 3D Data Compression, www.github.io, 2023 [retrieved on Dec. 5, 2023] Retrieved from the Internet: <URL: https://google.github.io/draco/> (3 pages).

Project Starline: Feel like you're there, together, www.blog.google, 2023 [retrieved on Jul. 17, 2024] Retrieved from the Internet: <URL: https://blog.google/technology/research/project-starline/ > (3 pages).

Magic Leap, www.magicleap.com, 2023 [retrieved on Jul. 8, 2023] Retrieved from the Internet: <URL: https://www.magicleap.com/en-us/> (9 pages).

Microsoft Hololens 2, www.microsoft.com, 2023 [retrieved on Jul. 10, 2024] Retrieved from the Internet: <URL: https://www.microsoft.com/en-us/hololens> (8 pages).

Nvidia PeopleNet Model, www.nvidia.com, 2023 [retrieved on Dec. 11, 2023] Retrieved from the Internet: <URL: https://catalog.ngc.nvidia.com/orgs/nvidia/ teams/tao/models/peoplenet> (2 pages).

StereoLabs, www.stereolabscom, 2023 [retrieved on Nov. 15, 2023] Retrieved from the Internet: <URL: https://stereolabs.com> (10 pages).

Telefónica showcases its holographic telepresence with 3D capture at MWC, , www.telefonica.com, 2023 [retrieved on Sep. 26, 2023] Retrieved from the Internet: <URL: https://www.telefonica.com/en/communication-room/press-room/telefonica-showcases-its-holographic-telepresence-with-3d-capture-at-mwc/> (7 pages).

* cited by examiner

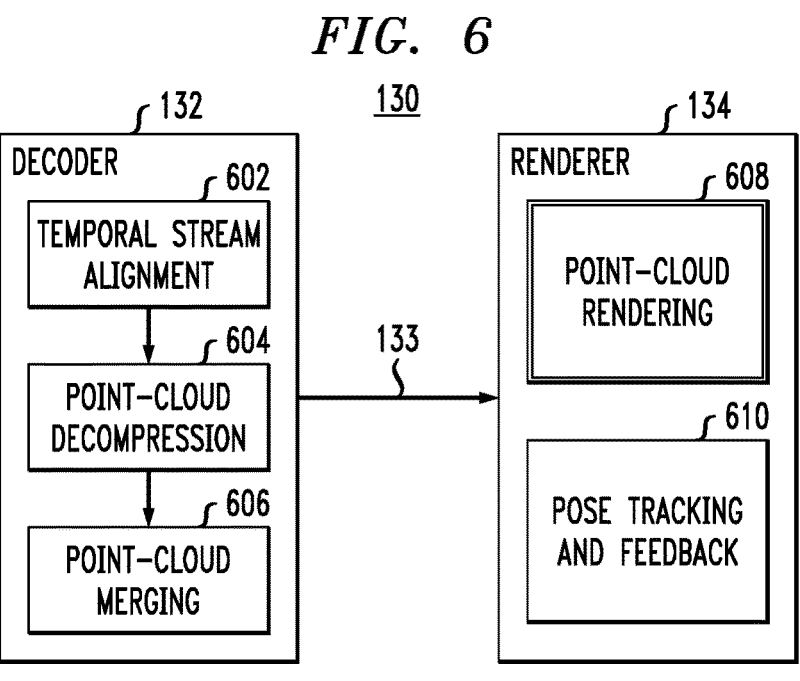

FIG. 7

Algorithm 1: Average CPU, GPU, and frame processing times.

Input: $f_i^k$ - the $i^{\text{th}}$ frame from camera $k$
Output: $C^k(i)$, $G^k(i)$, $F^k(i)$: the CPU, GPU, and total frame processing time at frame $i$, respectively.

1  $c_i^k \leftarrow \text{cpuTime}(f_i^k)$;

2  $g_i^k \leftarrow 0$; // GPU overhead of frame $i$

3  if isDispatchedToGPU($f_i^k$) then

4  $\quad\Big|\quad g_i^k \leftarrow \text{gpuTime}(f_i^k)$:

5  end

6  $C^k(i) \leftarrow \frac{1}{W}\sum_{i\text{-}W+1}^{t=i} c_t^k$;

7  $G^k(i) \leftarrow \frac{1}{W}\sum_{i\text{-}W+1}^{t=i} g_t^k$;

8  $F^k(i) \leftarrow \frac{1}{W}\sum_{i\text{-}W+1}^{t=i} (c_t^k + g_t^k)$;

FIG. 8

$$
N_u(i+1) = \begin{cases}
N_u(i) + \delta_c & \text{if } \max_{k \in K_u} C^k(i) < T - \epsilon, \text{ and} \\
& N_u(i) \leq N_u^{\max}, \text{ and} \\
& W \text{ frames since last update} \\
\\
\alpha \times N_u(i) & \text{if } \alpha N_u(i) > N_u^{\min}, \text{ and} \\
& (\max_{k \in K_u} C^k(i) \geq T \text{ or} \\
& \max_{k \in K_u} F^k(i) \geq T) \\
\\
\text{Unchanged} & \text{Otherwise}
\end{cases} \tag{1}
$$

$$
M_u(i+1) = \begin{cases}
M_u(i) + \delta_g & \text{if } \max_{k \in K_u} G^k(i) < T - \epsilon, \text{ and} \\
& M_u(i) \leq M_u^{\max}, \text{ and} \\
& W \text{ frames since last update} \\
\\
\beta \times M_u(i) & \text{if } \beta M_u(i) > M_u^{\min}, \text{ and} \\
& (\max_{k \in K_u} G^k(i) \geq T \text{ or} \\
& \max_{k \in K_u} F^k(i) \geq T) \\
\\
\text{Unchanged} & \text{Otherwise}
\end{cases} \tag{2}
$$

Figure 11:
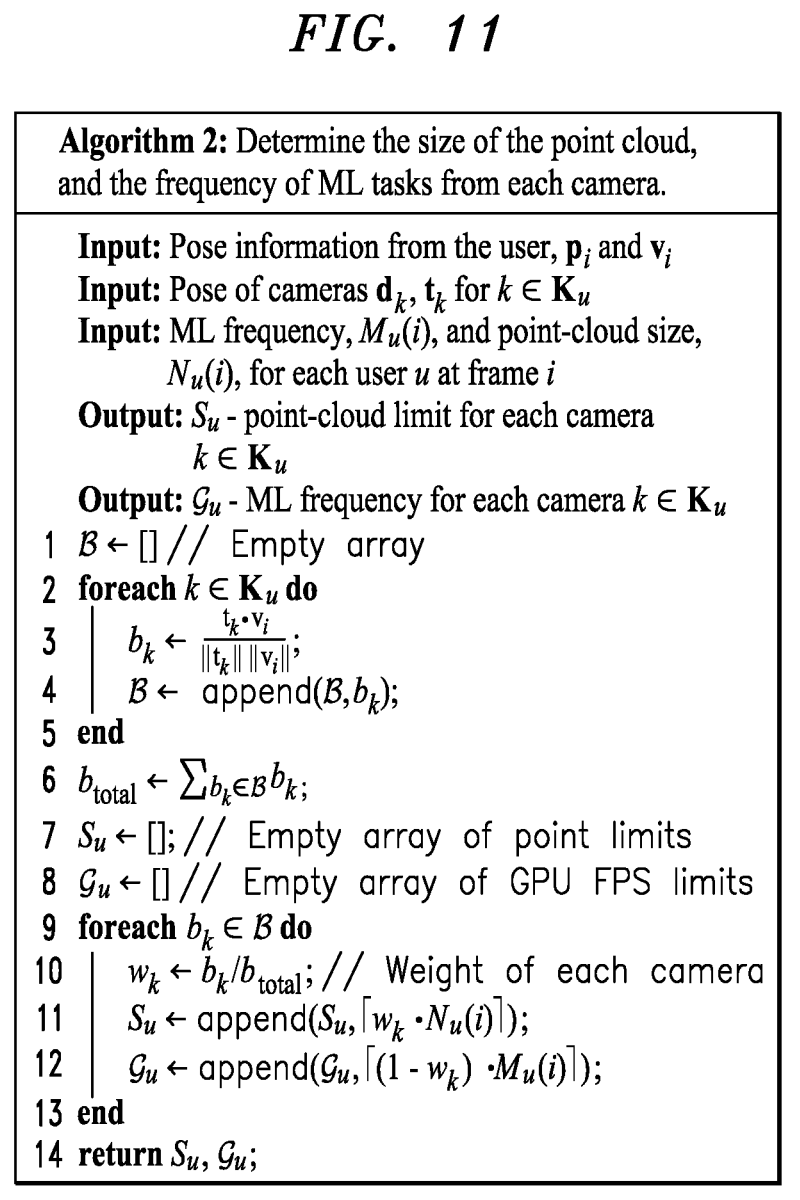

Algorithm 2: Determine the size of the point cloud, and the frequency of ML tasks from each camera.

Input: Pose information from the user, $\mathbf{p}_i$ and $\mathbf{v}_i$

Input: Pose of cameras $\mathbf{d}_k$, $\mathbf{t}_k$ for $k \in \mathbf{K}_u$

Input: ML frequency, $M_u(i)$, and point-cloud size, $N_u(i)$, for each user $u$ at frame $i$

Output: $S_u$ - point-cloud limit for each camera $k \in \mathbf{K}_u$

Output: $\mathcal{G}_u$ - ML frequency for each camera $k \in \mathbf{K}_u$

1  $\mathcal{B} \leftarrow [] \; // \; \text{Empty array}$

2  foreach $k \in \mathbf{K}_u$ do

3  $\quad$ $b_k \leftarrow \dfrac{\mathbf{t}_k \cdot \mathbf{v}_i}{\|\mathbf{t}_k\| \, \|\mathbf{v}_i\|}$;

4  $\quad$ $\mathcal{B} \leftarrow \text{append}(\mathcal{B}, b_k)$;

5  end

6  $b_{\text{total}} \leftarrow \sum_{b_k \in \mathcal{B}} b_k$;

7  $S_u \leftarrow []; \; // \; \text{Empty array of point limits}$

8  $\mathcal{G}_u \leftarrow [] \; // \; \text{Empty array of GPU FPS limits}$

9  foreach $b_k \in \mathcal{B}$ do

10  $\quad$ $w_k \leftarrow b_k/b_{\text{total}}; \; // \; \text{Weight of each camera}$ 11  $\quad$ $S_u \leftarrow \text{append}(S_u, \lceil w_k \cdot N_u(i) \rceil)$;

12  $\quad$ $\mathcal{G}_u \leftarrow \text{append}(\mathcal{G}_u, \lceil (1 - w_k) \cdot M_u(i) \rceil)$;

13  end

14  return $S_u, \mathcal{G}_u$;

FIG. 12

| Algorithm 3: Estimate the bounding box expansion. |
| --- |

Input: $\{f_i^k, k \in \mathbf{K}_u\}$ - the $i^{\text{th}}$ frame from each camera in the subset

Input: $\{\mathcal{D}_k, k \in \mathbf{K}_u\}$, $\{\mathcal{T}_k, k \in \mathbf{K}_u\}$, $\{\mathcal{F}_k, k \in \mathbf{K}_u\}$ - time-limited arrays of centroids, timestamps, and frames of cameras in the subset.

```
1  foreach k ∈ K_u do
2      if isDispatchedToGPU(f_i^k) then
3          D_k ← append(D_k, centroid(f_i^k));
4          T_k ← append(T_k, timestamp(f_i^k));
5          F_k ← append(F_k, f_i^k);
6      end
7  end
   /* Mean vector displacement per unit time
      across all cameras. w_k is the weight of
      camera k, as computed in Algorithm 2. */
```

8   $r \leftarrow \sum_{k \in \mathbf{K}_u} (1 - w_k) \cdot \sum_{j=2}^{N} ((d_j^k - d_{j-1}^k)/(t_j^k - t_{j-1}^k))$, where $d_j^k \in \mathcal{D}_k, t_j^k \in \mathcal{T}_k, N = \|\mathcal{D}_k\| = \|\mathcal{T}_k\|$;

```
9   ℰ ← [];  // List of bounding boxes.
10  foreach k ∈ K_u do
11      if isDispatchedToGPU(f_i^k) then
12          ℰ ← append(ℰ, boundingBox(f_i^k));
13      else
14          f* ← lastElement(F_k);
15          t* ← timestamp(f_i^k)) - timestamp(f*);
16          b* ← boundingBox(f*);
17          b* ← enlargeBy(b*, ‖r ·t*‖);
18          ℰ ← append(ℰ, b*);
19      end
20  end
21  return ℰ;
```

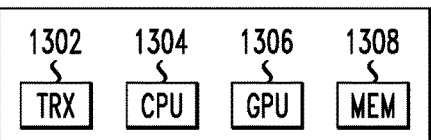

| 1302 | 1304 | 1306 | 1308 |
| --- | --- | --- | --- |
| TRX | CPU | GPU | MEM |

SCENE ENCODING FOR MULTI-USER MIXED-REALITY TELEPRESENCE

BACKGROUND

Field of the Disclosure

The present disclosure relates to video compression processing and, more specifically, to encoding techniques for multi-user mixed-reality telepresence.

Description of the Related Art

This section introduces aspects that may help facilitate a better understanding of the disclosure. Accordingly, the statements of this section are to be read in this light and are not to be understood as admissions about what is prior art or what is not prior art.

Mixed-reality (MR) telepresence is a new immersive experience that replaces staid video chats with three-dimensional, multi-camera, real-time, natural interactivity between networked users. It is envisioned that multiple users share a common, interactive, 3D space and can move around freely within that space, and interact with any one or more other users at any time. Target use-cases include multi-party meetings, immersive classroom lectures, large-group concerts, and other business and entertainment events that involve large numbers of participants. The potential of this hyper-realistic form of interactivity is rapidly gaining interest in the industry, and the market for such MR solutions is expected to exceed $120 billion in 2028.

Due to the high hardware and compute demands of MR experiences, a large-scale cloud-edge MR solution is needed to scale up the number of MR users to reach critical mass adoption. With this approach, users can engage in the MR environment using low-cost cameras at the edge, while offloading the complex 3D-world processing to the cloud servers. However, even with this model, the MR solution must overcome challenges that are distinct from those faced by similar large-scale interactive applications, such as cloud gaming, video conferencing, and live event streaming.

High Compute Demands from Concurrent Multiple Cameras. MR telepresence is a multi-camera application. The target 3D models are captured with multiple cameras to include a range of fields-of-view (FoVs) of the scene, since a single camera FoV will not provide the sufficient 3D degrees of freedom for other MR users. These 3D models constructed from these cameras are sent to MR users that navigate within this virtual world. Since a single 3D model is constructed using data from multiple cameras, the computational latency between cameras must be kept similar. As such, any camera with an unacceptably longer delay has its stream ignored to avoid a distorted combined 3D model. This dependence on multiple cameras significantly increases the computational complexity of the capture and encoding of the FoV streams and departs sharply from typical applications such as video conferencing that require only loosely synchronized camera streams between users.

Unpredictable Compute Demands. Compute demand is dependent on the context and pose of the user, i.e., the location of the user and the direction at which they are looking with their activities. Given any user, only a subset of one or more cameras that are pointed in a direction that is "closest" to the user's FoV should transmit the greatest number of 3D points and thus incurs the greatest compute latency. While seemingly straightforward, the caveat here is that this subset of closest cameras changes on the order of seconds depending on real-world human mobility which is difficult to predict accurately, thus leading to an overall unpredictability of MR pipeline compute demands.

The rapid changes in MR user pose, coupled with the long MR processing times means that the MR application must adopt a highly flexible pipeline that can adapt CPU/GPU compute demands on a millisecond timescale in response to unexpected user activity, so as to avoid the need for significant compute resource over-provisioning. Unfortunately, cloud scaling approaches such as utilizing Function-as-a-Service (FaaS) operate on the order of hundreds of milliseconds to seconds, along with significant performance variability, thus making them unsuitable for MR telepresence applications.

High GPU Contention. Direct streaming of 3D information requires a significant amount of network bandwidth (hundreds of Mbps and more). Hence, semantic understanding of the scenes, through extensive use of machine learning (ML) models, is used to compress the 3D model before transmission. With multiple cameras, each generating 3D frames at 30 FPS (or higher), there are multiple combinations of overlapping ML tasks that present a significant amount of contention on a shared edge GPU. In an MR environment with three cameras, GPU overhead can be 40% of the total compute overhead, increasing to over 80% with eight and more cameras. GPU-sharing solutions such as adaptive batching techniques can only be applied opportunistically due to the non-synchronized capture times of the cameras, and thus provide limited improvements. This opportunistic nature of ML tasks also limits the gains from operating system (OS)-layer sharing solutions. Fine-grained scheduling of deep neural network (DNN) operators requires complex pre-processing and provide only relatively small gains (<2.0×).

SUMMARY

Problems in the prior art are addressed in accordance with the principles of the present disclosure by an example edge-compute framework for large-scale MR applications, referred to herein as "Habbiton". Habbiton is deployed at a number of different edge servers, such as at Open Radio Access Network (O-RAN) RAN Intelligent Controllers (RICs) or local enterprise servers to provide MR experiences for a number of users. Habbiton involves multiple groups of, for example, Red Blue Green-Depth (RGB-D) cameras, each group of cameras covering a separate MR environment and connected to a corresponding edge server that generates 3D models and streams them to all remote MR participants. Habbiton is built upon the guiding principle of simplicity and efficiency. The Habbiton MR edge server achieves extreme responsiveness to large variations in compute demands that are not possible using other existing methods. With this principle in mind, Habbiton employs three key architectural design features that address the major challenges in large-scale MR experiences:

Camera Selection for Compute Reduction. Rather than continuously transmitting 3D point clouds from all cameras, Habbiton activates only a subset of cameras for each remote MR user. The MR users, target model, and cameras are all embedded within the same virtual coordinate space. Habbiton compares the pose of the user with the known position and FoVs of all cameras, and selects the subset of cameras whose combined point clouds span the FoV of the MR user. This is a coarse-grained but effective approach to reduce the compute requirements of the encoders. Separate (but possibly overlapping) camera subsets will be independently allocated to each MR user. Within each camera subset, Habbiton assigns higher-priority cameras (e.g., cameras that are "closer" to the MR user pose) a higher point-cloud capture density.

Responsive Pipeline Design. Habbiton reacts to rapid changes in compute demands by adopting an Additive-Increase Multiplicative-Decrease (AIMD) approach to resource scaling. The AIMD policy is applied to groups of cameras, rather than individual cameras. Habbiton determines the set of cameras that span the FoV of a user. Habbiton then continuously monitors the compute latency of the CPU/GPU modules for all cameras within this set. If the CPU/GPU latency of some camera in the set exceeds a threshold, then Habbiton multiplicatively reduces the total size of all point clouds and/or the frequency of ML task dispatches within the set. During other periods, Habbiton additively increases the GPU ML rate and point-cloud size for all cameras within the set based on the performance of a single camera to fully utilize the available compute resources. Applying AIMD to the set of cameras rather than individual cameras achieves the goal of ensuring coherent performance across multiple cooperating cameras for the same user.

Context-Aware GPU Sharing. Habbiton uses object classification, detection, segmentation, and tracking ML models to decompose the 3D scene into components and identify the minimum set of objects that are captured and transmitted to present an immersive experience for the MR user. In order to filter the correct 3D model from the entire scene, the ML object detection task is executed periodically to track the position of the target object as it moves. However, higher-priority cameras that transmit denser point clouds can support only a lower ML task frequency in order to maintain a 30 FPS average frame rate. Hence, as described below in the context of Algorithm 2 of FIG. 11, Habbiton assigns higher ML task frequencies to lower-priority cameras, and uses the tracked object trajectory from low-priority cameras to infer the position of the object in the other, higher-priority cameras. Habbiton uses ML tasks for object classification, detection, segmentation, and tracking to decompose the scene into manageable blocks of 3D data that are encoded/compressed and transmitted. While this reduces the ML latency, particularly on the high-priority cameras, it does incur inherent tracking inaccuracies. Habbiton compensates for this by utilizing these high-frequency, low-priority ML tasks to update the size of the bounding boxes in the higher-priority cameras, as described below in the context of Algorithm 3 of FIG. 12.

In summary, Habbiton is a novel, mixed-reality edge server that enables large-scale MR experiences and is highly responsive to the highly variable workloads unique to MR telepresence applications. Habbiton can be fully implemented on an edge server with a dual-core AMD CPU with 256 cores from Advanced Micro Devices, Inc., of Santa Clara, California, 512 GB RAM, and four Nvidia A100 GPUs from Nvidia Corporation of Santa Clara, California, thus allowing Habbiton to be evaluated on actual large-scale workloads. In this way, Habbiton can be evaluated in a real-world setup with multiple cameras, along with emulated extremely large-scale MR experiences. Habbiton enables efficient MR experiences for a large number of scenes and users.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 6 is a functional block diagram representing the functions of the decoder and the renderer of each scene rendering subsystem of FIG. 1;

FIG. 7 shows pseudocode for Algorithm 1;

FIG. 8 shows the AIMD policy for Algorithm 1;

FIG. 9 is a pictorial representation of the "Left-Hand, Y-U p" coordinate system employed by Habbiton;

FIG. 11 shows pseudocode for Algorithm 2;

FIG. 12 shows pseudocode for Algorithm 3; and

FIG. 13 is a simplified hardware block diagram of an example node that can be used to implement any of the nodes of FIG. 1.

DETAILED DESCRIPTION

Figure 1:
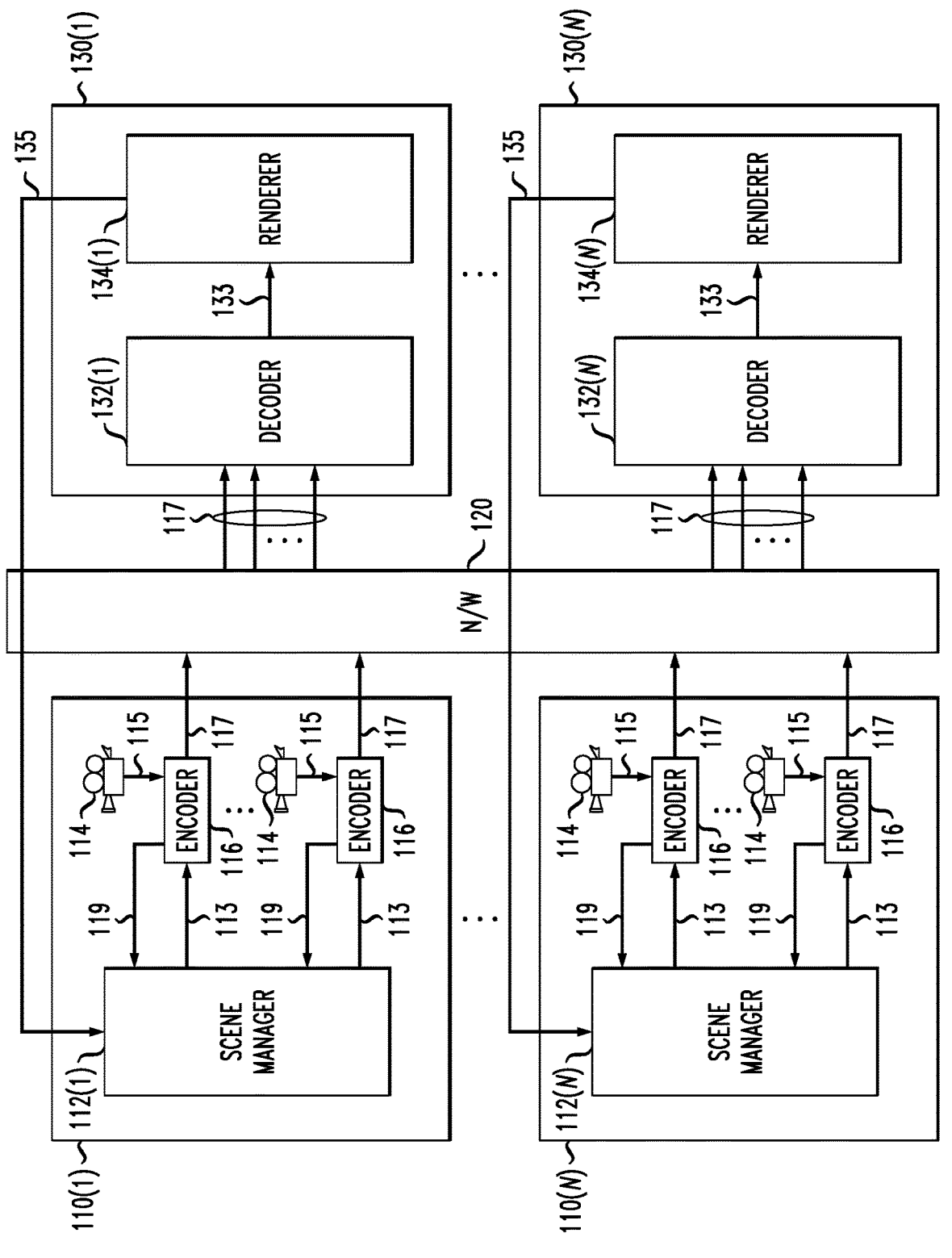
FIG. 1 is a block diagram of one possible implementation of the Habbiton mixed-reality system.

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Background and Motivation

Mixed-reality telepresence is a multi-camera application that employs live capture of volumetric video and transmission to destination users for rendering. An MR environment comprises scenes and users. A scene comprises a user together with multiple cameras that capture a live volumetric video stream of the user and their environment from different perspectives.

Challenges

Mixed-reality edge servers support MR experiences for multiple users, each of whom is served by an edge server that is in close proximity to the user. MR data streams are exchanged with other MR edge servers as users interact over a virtually composite and large area. This section highlights the challenges encountered at the MR encoder when supporting a large number of participating MR users.

Broadly speaking, the encoder first generates point clouds from the RGB-D video streams from each camera. The encoder then uses ML models to detect the important segments of the scene. The points representing these target segments are then compressed and transmitted to the decoders. At the decoder, the point-cloud streams are decompressed, merged into 3D models, and rendered for viewing by the MR user. To highlight the challenges faced at the MR edge server, consider an MR encoder and decoder that follow this basic design. The MR edge server processes the data stream from multiple of these cameras concurrently. This MR process may be run on a system using an AMD EPYC 7513 32-Core CPU, a 256 GB RAM, and a Nvidia A100 40 GB GPU. The Nvidia PeopleNet Model may be used to find the target human figures in every frame, and each encoder compresses the 80000-point human point cloud at 30 frames per second (FPS).

Extremely High MR Compute Demands. At 30 FPS, the limit for inter-frame latency is under 33.3 ms. With the large number of cameras involved, processing latency for each frame can easily exceed this target frame latency. Consider a ZED RGB-D camera from Stereolabs Inc. of San Francisco, California, with an 88° horizontal FoV. A scene requires a minimum of five cameras for 360° foV coverage. Directly processing data from all cameras without optimizations can limit edge platforms to support only one user. A practical MR edge server will need to scale up to significantly more users to be a viable solution.

Realistically, each user within the mixed-reality platform views only a portion of the larger environment. Hence, in MR experiences that involve only a small number of people such as small group conferences and one-on-one meetings, it is unnecessary to encode and transmit streams from all cameras concurrently.

Existing approaches to filtering the MR point cloud based on the user FoV include first combining the point clouds from multiple cameras into a single 3D model. Redundant points from multiple cameras are iteratively removed by considering the overlapping FoV limits of the input cameras. See, e.g., Y. Guan et al., "Metastream: Live volumetric content capture, creation, delivery, and rendering in real time," *Proceedings of the 29th Annual International Conference on Mobile Computing and Networking*, ACM Mobi-Com '23, New York, NY, US, 2023, Association for Computing Machinery, the teachings of which is incorporated herein by reference in their entirety. This presents a sizeable computation overhead for each transmitted frame, and, while it is feasible for small point clouds, it is not scalable for higher-resolution MR experiences. Foveated rendering is another technique that reduces the number of points processed by the renderer at the MR end-user headset. See, e.g., G. K. Illahi et al., "Foveated streaming of real-time graphics," *Proceedings of the 12th ACM Multimedia Systems Conference*, MMSys '21, pages 214-226, New York, NY, USA, 2012, Association for Computing Memory; B. Krajancich et al., "Towards attention-aware foveated rendering," *ACM Trans. Graph.*, 42(4), July 2023; and O. T. Tursun et al., "Luminance-contrast-aware foveated rendering," *ACM Trans. Graph.*, 38(4), July 2019, the teachings of all three of which are incorporated herein by reference in their entireties. While this reduces the rendering overhead, it has little impact on the encoder compute demands.

Highly Variable Compute Requirements. The dynamics of MR users present a highly dynamic compute environment that sharply departs from typical applications. For an MR end-user moving about the MR space, the fixed camera that is best positioned to capture the user can change on the order of seconds, and the nature of the camera-to-camera handover is wholly dependent on shared compute demands and user-mobility patterns that are difficult to predict. See, e.g., S. Gul et al., "Low-latency cloud-based volumetric video streaming using head motion prediction," *Proceedings of the 30th ACM Workshop on Networking and Operating Systems Support for Digital Audio and Video*, NOSSDAV '20, pages 27-33, New York, NY, USA, 2020, Association for Computing Machinery; and S. Gul et al., "Cloud rendering-based volumetric video streaming system for mixed reality services," *Proceedings of the 11th ACM Multimedia System Conference*, MMSys '20, pages 357-360, New York, NY, USA, 2020, Association for Computing Memory, the teachings of both of which are incorporated herein by reference in their entireties.

To see how this is so, consider the following calculation. A 1080p stereo video stream from a ZED camera has a horizontal field of view of 88°. A user at a distance of about 4 m (the average length of a U.S. room) will move out of the FoV of the camera every 7.7 m. Given an average walking speed of 1.3 m/s, a camera switch occurs every 5.9 s. As a point of comparison, when streaming a video over a 5G network, even at vehicular highway speeds, interruptions due to handover between base stations occur on the order of minutes.

An obvious solution to this issue is to over-provision the edge server to allow sufficient processing capacity for all cameras all the time. However, this is not a feasible approach. As a result, as users move within the MR space, the number of camera subsets that the MR edge server must process can change over several seconds, resulting in significant variability in the available compute for each MR user. Furthermore, any MR server running on a commercial off-the-shelf (COTS) edge/cloud architecture will encounter background tasks, service migrations, and load-balancing events that can sporadically impact the available compute capacity available to the MR camera instances.

High GPU Demand. The MR application heavily employs GPU-implemented ML models to identify and transmit only the important areas of the scene, to reduce the otherwise high network bandwidth demand. GPU latency for ML inference is a significant portion of the overall frame latency. Even with only a single camera, the ML task takes about 28% of overall frame time. This overhead increases to over 65% with 16 concurrent cameras, and increases further as the number of users on the edge server increases. It is evident that big improvements in the efficient use of the GPU are necessary for scaling the performance of the MR edge server.

System Design

Overview

Habbiton Architecture. FIG. 1 is a block diagram of one possible implementation of the Habbiton mixed-reality system 100. Habbiton is a mixed-reality telepresence framework that runs on one or more edge servers. As shown in FIG. 1, MR system 100 has N>1 scene encoding subsystems 110(1)-110(N) that communicate via a suitable network 120 with N scene rendering subsystems 130(1)-130(N). Habbiton has four main components that enable mixed-reality experiences with multiple scenes and users: scene managers 112, encoders 116, decoders 132, and renderers 134. In particular, each scene encoding subsystem 110 has a number of video cameras 114, each of which has a corresponding encoder 116, where the operations of the encoders 116 are controlled by a local scene manager 112. Each scene rendering subsystem 130 has a decoder 132 and a renderer 134. Note that each edge server may have one or more scene encoding subsystems 110 and one or more corresponding scene rendering subsystems 130.

In operation, for each scene encoding subsystem 110, based on control signals 113 from the local scene manager 112, each encoder 116 is capable of encoding the video stream 115 generated by its corresponding video camera 114 to generate an encoded video stream 117 that is transmitted via the network 120 to one or more of the scene rendering subsystems 130. The scene manager 112 controls the operations of each encoder 116 based, in part, on encoder feedback signals 119 characterizing the encoder's performance.

Note that the scene manager 112 independently controls whether or not the video stream 115 from each camera 114 is encoded by the corresponding encoder 116. In addition, the scene manager 112 also independently controls which encoded video streams 117 are transmitted to which scene rendering subsystems 130. As a result, at any given time, each scene encoding subsystem 110 generates one or more encoded video streams 117, where each of those encoded video streams 117 is transmitted to one or more scene rendering subsystems 130.

As such, for each scene rendering subsystem 130, the decoder 132 receives and decodes one or more encoded video streams 117 from each of multiple, different, scene encoding subsystems 130 and merges the decoded streams into a composite video stream 133 corresponding to a combined scene for the user, which is provided to the renderer 134, which renders the combined scene for the user, e.g., at the user's headset. As represented in FIG. 1, each renderer 134 provides feedback signals 135 characterizing its operations to its corresponding scene manager 112, which uses the feedback signals 135 to control the operations of the local encoders 116. A scene manager 112 manages all the cameras 114 for a particular scene as well as the views for one or more different end-users. This means that each scene rendering subsystem 130 has one or more scene managers 112 from which it receives encoded video streams 117. As such, the feedback signals 135 from each scene rendering subsystem 130 are sent to all of the scene managers 112 from which the scene rendering subsystem 130 receives encoded video streams 117.

In the MR system 100 of FIG. 1, the number N of scene encoding subsystems 110 is equal to the number N of scene rendering subsystems 130, where each scene encoding subsystem 110(*i*) and a corresponding scene rendering subsystem 130(*i*) are both implemented in a single MR edge server of a particular user of the MR system 100. Each user uses the scene encoding subsystem 110 of their MR edge server to generate one or more encoded video streams 117 corresponding to the user's local scene that are transmitted via the network 120 to the MR edge servers of one or more other users of the MR system 100. In addition, each user uses the scene rendering subsystem 130 of their MR edge server to decode multiple different encoded video streams 117 received from the MR edge servers of one or more other users and generate a combined scene that is rendered to the user. Note that, although not shown in FIG. 1, the user's locally generated encoded video streams 117 are also available to the user's local scene rendering subsystem 130.

In other possible implementations, the number of scene encoding subsystems 110 may be different from the number of scene rendering subsystems 130. In such implementations, some MR edge servers will have only a scene encoding subsystem 110 or only a scene rendering subsystem 130.

Figures 2A, 2B, 2C:
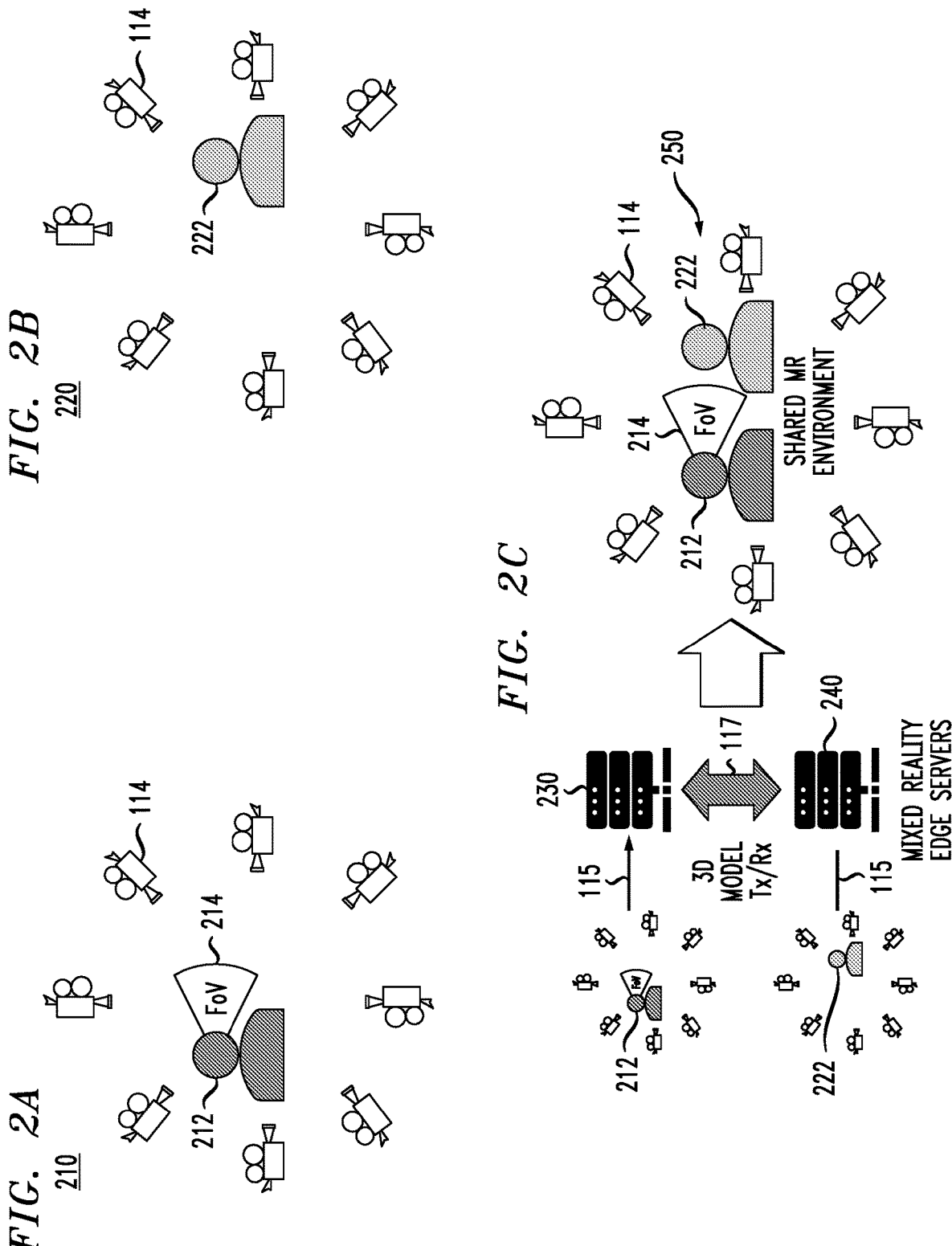
FIGS. 2A-2C illustrate a simple, example MR telepresence scenario for two users.

FIGS. 2A-2C illustrate a simple, example MR telepresence scenario for two users. FIG. 2A shows a top-down view of the scene 210 of a local user 212. Within this scene 210, the pose of the local user 212 refers to the user's location and direction in which the user is looking. This is denoted in FIG. 2A as the local user's field-of-view (FoV) 214. FIG. 2B shows a similar setup for the scene 220 of a remote user 222.

As represented in FIG. 2C, the video streams 115 generated by the video cameras 114 of the local user 212 are encoded by the scene encoding subsystem in the local user's MR edge server 230 to generate encoded video streams 117 that are transmitted to the remote user's MR edge server 240. Concurrently, the video streams 115 generated by the video cameras 114 of the remote user 222 are encoded by the scene encoding subsystem in the remote user's MR edge server 240 to generate encoded video streams 117 that are transmitted to the local user's MR edge server 230, which decodes those encoded video streams 117 and combines the corresponding decoded video streams with the local user's own video streams to generate and render, to the local user 212, a combined scene 250 that corresponds to the combination of the local user's scene 210 with the remote user's scene 220 based on the field of view 214 of the local user 212. In other words, these two volumetric encoded video streams 117 are combined at the local user's MR edge server 230 to generate the MR environment for the local user 212. For example, the local user's MR edge server 230 may render the remote user 222 within the head-mounted display (HMD) of the local user 212, so that the local user 212 can interact with the remote user 222 as if both share the same physical space. Although not represented in FIG. 2C, concurrently, the remote user's MR edge server 240 generates an analogous combined scene but based on the potentially different field of view of the remote user 222.

Figure 3:
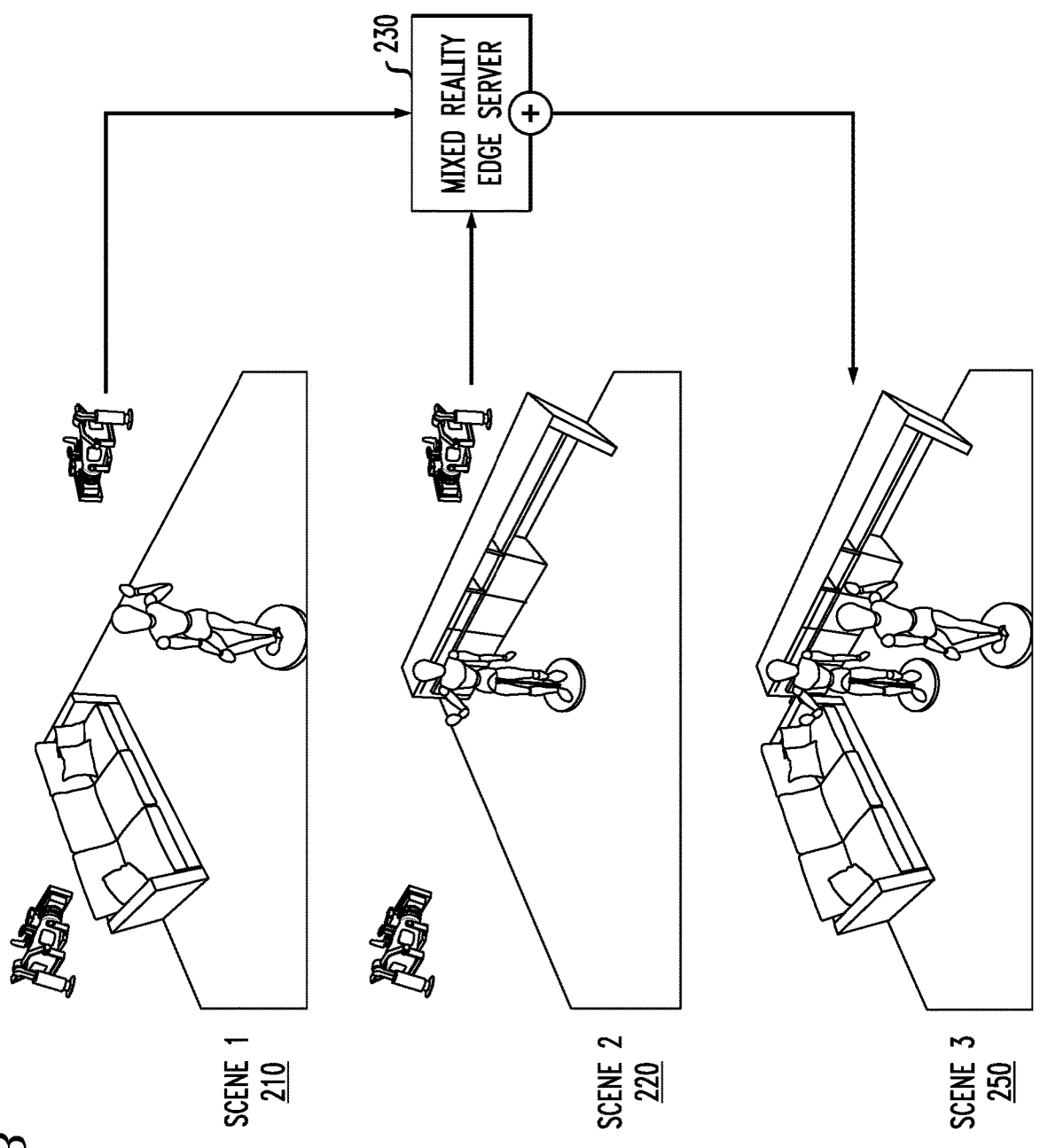
FIG. 3 illustrates an example of the processing of FIGS. 2A-2C.

FIG. 3 illustrates an example of the processing of FIGS. 2A-2C, where the local user's scene 210 corresponds to the local user's FOV 214 of FIG. 2A, the remote user's scene 220 also corresponds to the local user's FOV 214, and the local user's combined scene 250 also corresponds to the local user's FOV 214. As shown in FIG. 3, the local user's MR edge server 230 combines the users' individual scenes 210 and 220 to generate the combined scene 250 rendered to the local user 212. Note that the person in the local user's scene 210 is not the local user 212, but rather a different person in the local user's FOV 214, while the person in the remote user's scene 220 may indeed be the remote user 222.

Figures 4, 5:
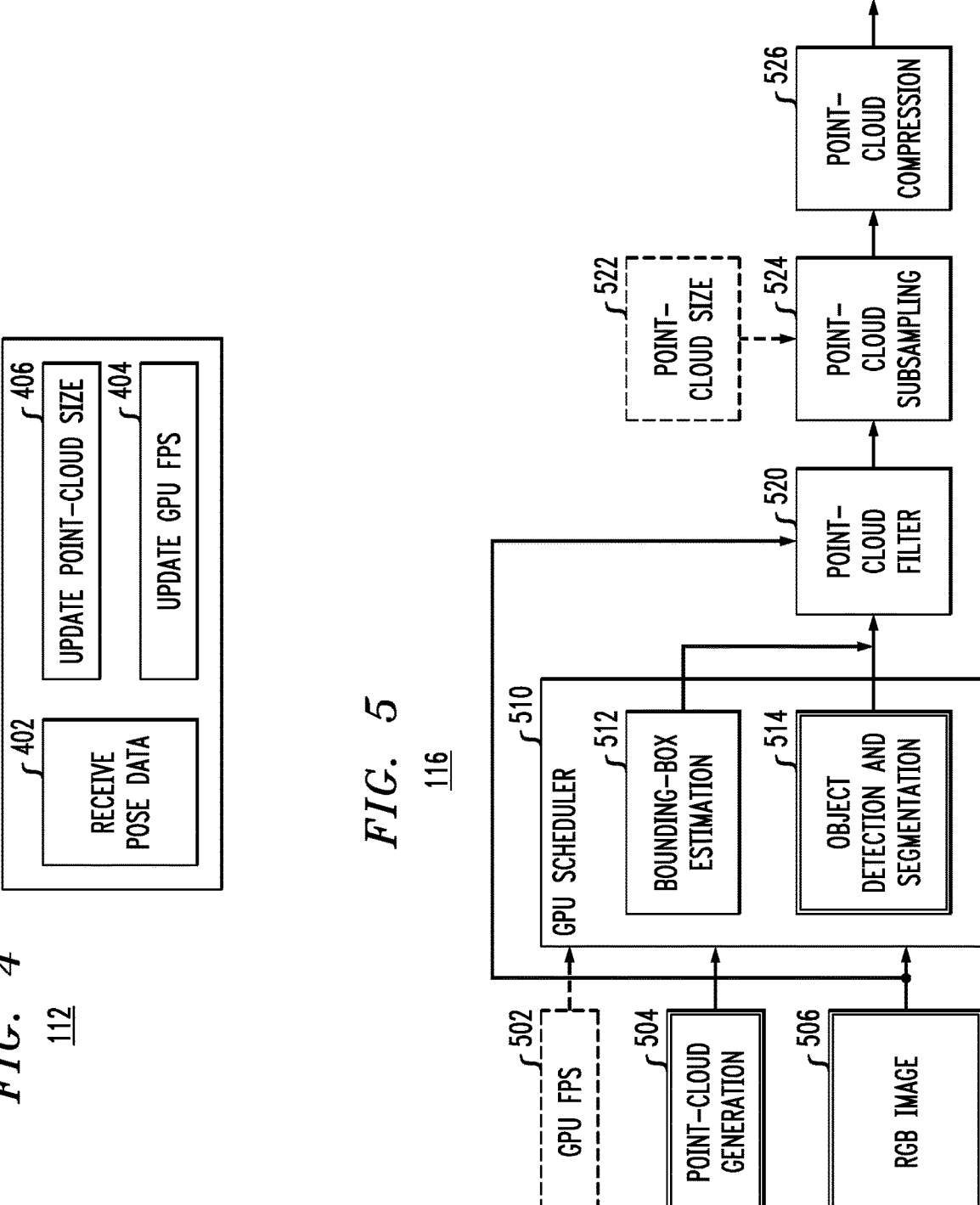
FIG. 4 is a functional block diagram representing the functions of each scene manager of FIG. 1.
FIG. 5 is a functional block diagram representing the functions of each encoder of FIG. 1.

FIG. 4 is a functional block diagram representing the functions of each scene manager 112 of FIG. 1, FIG. 5 is a functional block diagram representing the functions of each encoder 116 of FIG. 1, and FIG. 6 is a functional block diagram representing the functions of the decoder 132 and the renderer 134 of each scene rendering subsystem 130 of FIG. 1. These various functions will be described further below. Functions 502 and 522 of FIG. 5 are represented using dashed-line boxes indicating that they are inputs received by the encoder 116 from the scene manager 112. Functions 504, 506, and 514 of FIG. 5 and function 608 of FIG. 6 are represented using double-line boxes indicating that they are each implemented on a GPU, while all other functions 402-406, 512, 520, 524, 526, 602-606, and 610 in FIGS. 4-6 are represented using single-line boxes indicating that they are each implement on a CPU.

Encoder. Habbiton uses a series of "dumb" RGB-D cameras 114 dispersed throughout an area of interest to live capture volumetric video of people and objects from all perspectives at 30 FPS. Referring to FIG. 1, every RGB-D frame 115 from each local camera 114 currently selected by the scene manager 112 is sent to the encoder 116, where, referring now to FIG. 5, both an RGB image 506 is extracted and a point cloud 504 is generated. The RGB image and point-cloud frames are then sent to a GPU Scheduler 510 that schedules the object detection task to determine bounding boxes around the objects that Habbiton will encode for the user. The GPU Scheduler 510 sends at most "GPU FPS" (502) RGB frames to the encoder's GPU for object detection each second. Other intermediate (i.e., skipped) frames will be processed by a Bounding Box Estimation component 512 to update the estimated bounding box position. The Point Cloud Filter module 520 retains only the points inside the bounding box, and the Point Cloud Subsampling module 524 discards a sufficient number of (e.g., randomly sampled) retained points to ensure that no more than "POINT CLOUD SIZE" (522) points are compressed. Finally, the Point Cloud Compression module 526 compresses the point cloud, e.g., using Draco 3D Data Compression from Google LLC of Mountain View, California, and sends the compressed data 117 over the network 120 to the decoder 132 of FIG. 1.

Decoder. The Habbiton decoder 132 of FIG. 6 runs on an edge server that is closest to the MR user and, depending on the implementation, this can be a separate edge server from the Habbiton encoder 116 or the same edge server. There is one decoder 132 for each MR user, and a decoder 132 can receive encoded video streams 117 originating from one or more scenes. Habbiton sends encoded point-cloud streams 117 from different cameras 114 separately to the target decoder 132. Each point cloud in each encoded stream 117 is timestamped with its capture time at its respective camera 114. The decoder 132 receives these encoded point-cloud streams 117, decompresses (604) them, and merges (606) the points into a composite point cloud 133. This composite point cloud 133 is then sent to the renderer 134 for display, for example, on the user's HMD. The Temporal Stream Alignment component 602 at the decoder 132 uses the timestamps to select one received point cloud from each camera 114 for each combined composite point cloud. This set of point clouds is selected such that the mutual time offset between them is minimized, thus minimizing any distortions in the final composite point cloud.

Renderer. The renderer 134 receives the stream 133 of composite point clouds from the decoder 132 and renders (608) it in the local user's HMD. The renderer 134 also receives a stream of user pose information from the local user's HMD, and, as shown in FIG. 1, but not in FIG. 6, sends this pose stream (135 of FIG. 1) to the scene manager 112 of every scene with which the user is interacting.

Scene Manager. The scene manager 112 receives the stream 135 of pose information from all users (402 of FIG. 4), along with GPU and CPU processing latencies 119 for all of its local cameras 114, within its scene. The scene manager 112 then selects the set of cameras 114 along with the GPU FPS (404) and point-cloud size (406) for each user that is interacting with this scene. These operations are described further below.

Reactive Compute Architecture. Habbiton is designed to process multiple cameras 114 cohesively on a shared edge server that includes one or more CPUs and GPUs.

Responsive Resource Scheduling. Habbiton addresses the limitation of responsive resource scheduling with an important insight. When Habbiton encounters a sudden change in available compute capacity, Habbiton demands a rapid reduction in compute demand. This will permit a graceful, controlled degradation of services for MR users, where the MR models can still be delivered at an acceptable frame rate, but at a lower resolution. This is preferable to unpredictable frame drops and stuttered rendering which can result in user discomfort. Habbiton utilizes the Additive-Increase Multiplicative-Decrease (AIMD) approach to resource scheduling.

The compute demands of Habbiton on the CPU and GPU are governed by (a) the size of the point cloud in each 3D frame and (b) the number of frames-per-second of RGB data dispatched to the GPU, respectively. Not every frame processed by Habbiton is dispatched to the GPU for object detection. Let $C^k(i)$, $G^k(i)$, and $F^k(i)$ be the mean CPU, GPU, and total frame processing times, respectively, of the $i^{th}$ frame from the camera k. These mean values are computed over a window of size W frames and are obtained using Algorithm 1 of FIG. 7.

Algorithm 1 computes the average CPU, GPU, and overall frame processing times taken by each scene-manager-to-renderer/user pipeline. These values are used by the rest of the adaptation algorithms. Algorithm 1 returns a windowed average of each of these parameters using a window of size W frames. In Line 1 of Algorithm 1, the amount of CPU time for processing the ith frame from camera k is returned by the cpuTime function. In Line 2, the amount of GPU time for processing the ith frame from camera k is initialized to 0. If the ith frame from camera k was processed by a GPU as determined by the logical function isDispatchedToGPU, then the amount of GPU time for processing the ith frame from camera k is returned by the gpuTime function. Note that, as represented by Line 1, each frame is processed by the CPU, but not every frame is processed by the GPU, as represented by Lines 2-5. In Lines 6-8, the three average values are computed for the ith frame from camera k.

$K_u$ is the subset of currently selected cameras (114 of FIG. 1) for a user u. Let $N_u(i)$ be the total number of point-cloud points transmitted for the $i^{th}$ frame of all cameras in $K_u$, and let $M_u(i)$ be the total number of frames from all cameras in $K_u$ that are dispatched to the GPU each second. All cameras within the same group $K_u$ generate frames synchronously, where the $i^{th}$ frame of the group refers to the $i^{th}$ frame of each camera $k \in K_u$.

$N_u(i)$ and $M_u(i)$ are adapted at each frame, for CPU- and GPU-bound computations, respectively, according to the AIMD policy shown in FIG. 8, where $0 \le \alpha, \beta < 1$, and T is the maximum allowable processing time for each frame and is dependent on the maximum tolerable latency for the MR application. The size of the point cloud of each camera subset will be increased by $\delta_c$ every W frames as long as the CPU delay for any individual camera does not exceed the frame processing threshold. However, at any time that the CPU delay for any individual camera is found to exceed the threshold, the point-cloud size for the entire camera subset will be reduced by a factor of a immediately to maintain the system FPS performance. Similarly, the object detection FPS of each camera subset will be increased by $\delta_g$ every W frames as long as the GPU delay for any individual camera does not exceed the frame processing threshold. However, at any time that the GPU delay for any individual camera is found to exceed the threshold, the ML FPS limit for the entire camera subset will be reduced by a factor of a immediately to maintain the system FPS performance. This heuristic allows both the CPU and GPU thresholds to separately evolve to match the limits of the available CPU and GPU computing capacity on the edge server.

FIG. 8 has six conditions, and the description, from top to bottom, is as follows:
    (1) The number of point-cloud points is increased by an additive amount if (a) the maximum average CPU frame processing time across all cameras in the same set is less than the maximum allowable processing time for each frame, and (b) the number of points in the point cloud is below the maximum threshold, and (c) it has been W frames since the last update.

(2) The number of point-cloud points is multiplicatively reduced if (a) the reduced number of points will still be greater than the minimum point threshold, and (b) the maximum average CPU processing time or the maximum average frame processing time exceeds the allowed time limit for each frame.

(3) Otherwise, the number of point-cloud points is unchanged.

(4) The rate of frames sent to the GPU is increased by an additive amount if (a) the maximum average GPU frame processing time across all cameras in the same set is less than the maximum allowable processing time for each frame, and (b) the rate of frames sent to the GPU is below the maximum threshold, and (c) it has been W frames since the last update.

(5) The rate of frames sent to the GPU is multiplicatively reduced if (a) the reduced rate of frames sent to the GPU will still be greater than the minimum frame rate threshold, and (b) the maximum average GPU processing time or the maximum average frame processing time exceeds the allowed time limit for each frame.

(6) Otherwise, the rate of frames sent to the GPU is unchanged.

The maximum ML FPS $M_u^{max}$ for the subset $K_u$ is set to $\|K_u\|$. FPS as this is the point where every frame from every camera 114 in the subset is sent to the GPU. Similarly, $M_u^{min} = \|K_u\|$ so that object detection is performed on at least one frame per second from each camera 114. Note that $N_u(i)$ and $M_u(i)$ are totals across all cameras in $K_u$. Subsequent sections describe how the point-cloud size and GPU FPS for each camera 114 in the subset are allocated from these subset totals.

User Admission Control. Habbiton admits a new user into the edge server if and only if $N_u(i) > N_u^{min}$ and $M_u(i) > M_u^{min}$, where $N_u^{min}$ and $M_u^{min}$ are the minimum thresholds for the number of points and frames, respectively, and $N_u(i)$ and $M_u(i)$ are the current allocations of points and frames, respectively. If the current allocations are greater that the respective minimum thresholds, then the server has additional GPU and CPU compute capacity to support an additional user. Otherwise, the user is not admitted into the MR environment.

Camera Load Adaptation

Habbiton deploys cameras 114 to cover the MR environment from multiple FoVs, so that users can move about the space freely. Habbiton adapts both the number of cameras 114 and the compute demand of each camera 114 to the user context.

Point-Cloud Size Adaptation. Habbiton adopts an alternative lightweight camera selection and point filtering technique that is based on comparing the pose of the Habbiton input camera 114 with the time-varying pose of the MR end-user as captured by the MR HMD.

Figure 9:
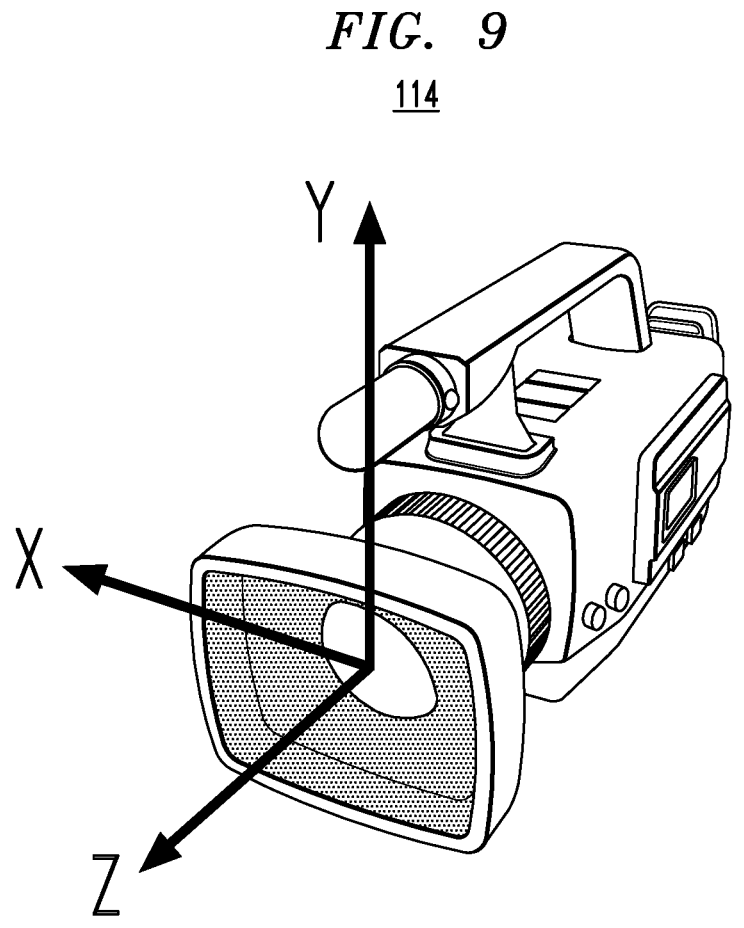

Recall that the cameras 114 in Habbiton are localized within the MR coordinate space, i.e., Habbiton has the transformation matrix for each camera 114 within the MR space. Habbiton employs a "Left-Hand, Y-U p" coordinate system, as shown in FIG. 9. For a particular camera k, the 4×4 transformation matrix that positions this camera with the MR coordinate space is given by:

$$A_k = \begin{bmatrix} R_k & t_{k]} \\ 0 & 1 \end{bmatrix}$$

where $R_k$ is a 3×3 rotation matrix and $$t_k = \begin{bmatrix} t_x^k, t_y^k, t_z^k \end{bmatrix}^T$$

is a 3D translation vector. $t_k$ is the position of camera k, while the direction at which the camera is looking can be found as follows:

$$d_k = R_k \cdot \begin{bmatrix} 0 \\ 0 \\ 1 \end{bmatrix}$$

Note that $d_k$ points outwards from the center of the FoV of camera k. The position $t_k$ and direction $d_k$ make up the pose of the user with respect to camera k.

Let $p_i$ be the position of the user in MR space and $v_i$ be the direction that the user is facing at frame i. To determine if the FoV of camera k overlaps with the FoV of the user, the following derived condition is used:

$$t_k + m_0 d_k = p_i + m_1 v_i$$

$$m_0 d_k - m_1 v_i = p_i - t_k$$

$$[d_k - v_i] \begin{bmatrix} m_0 \\ m_1 \end{bmatrix} = p_i - t_k$$

where camera k will be the camera subset of the user (i.e., $k \in K_u$) if both $m_0 > 0$ and $m_1 > 0$.

Figure 10B:
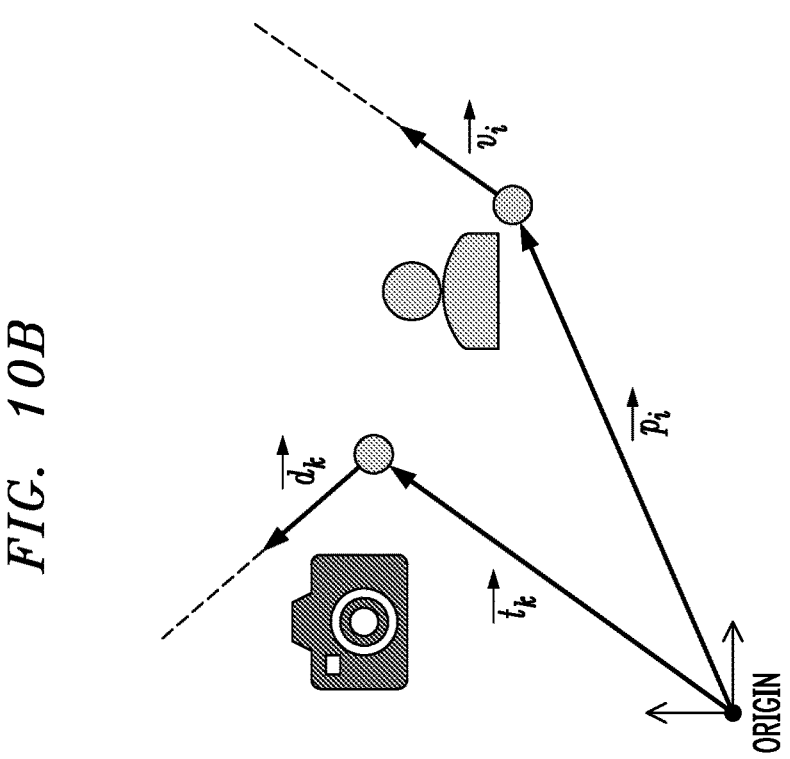
FIGS. 10A and 10B illustrate the selection policy implemented by Habbiton.
Figure 10A:
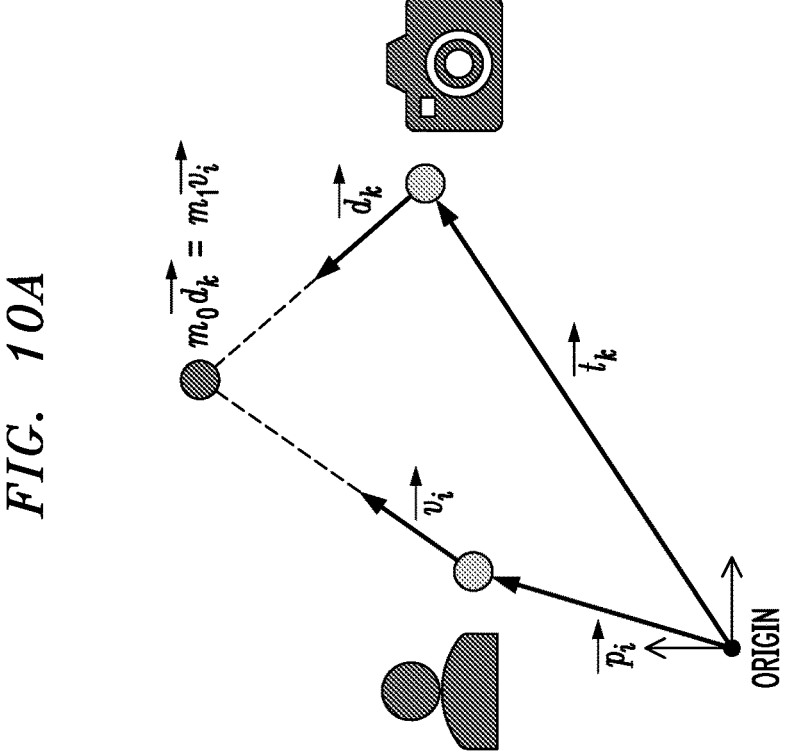

FIGS. 10A and 10B illustrate the selection policy of the previous condition. In FIG. 10A, the camera k will provide points within the FOV of user i. In FIG. 10B, even though the direction $d_k$ of the camera k and the direction $v_i$ of the user's FOV are unchanged from FIG. 10A, the camera does not capture any points within the user's FOV. As such, cameras in $K_u$ cannot be selected using only the direction vectors $t_k$ and $v_i$. FIGS. 10A and 10B show how the camera and user FoVs do not overlap even though the direction vectors are within 90° of each other.

Habbiton partitions the total point-cloud size $N_u(i)$ assigned to the user u to each of the cameras in $K_u$ using Algorithm 2 of FIG. 11. The weight (i.e., priority) $w_k$ of each camera in $K_u$ is given by the magnitude of the dot product between the direction of the camera and that of the user pose. The greater the weight, the greater the overlap between the FoV of the user and camera, and hence, the greater the size of the point cloud transmitted by that camera. This point-cloud size allocation is returned in parameter Su.

Algorithm 2 determines the size of the point cloud, and the frequency at which ML tasks are sent to the GPU from each camera. Habbiton uses object and people detection to segment the scene into discrete components. Habbiton can support other ML tasks, depending on the nature of the MR experience. ML computer vision models are commonly deployed for scene understanding, and the choice of people detection is for demonstrating Habbiton in this particular configuration. However, it does not preclude the use of other ML tasks (e.g., human pose detection) that may be included. The scheduling framework will work with these arbitrary ML tasks unchanged. The input to this algorithm is the pose information of the user (its translation and rotation), the pose of each camera in the set (translation and rotation), and the point-cloud size and ML frequency from Algorithm 1. Lines 1-6 compute the normalization factor for each camera. Line 10 determines the weight (i.e., priority) assigned to each camera in the set, and Lines 11 and 12 assign the size of the point cloud and ML frequency to each camera depending on its previously determined weight (or priority). As indicated by the multiplier $w_k$ in Line 11, the higher the camera priority, the greater the point-cloud size and therefore the greater the allocation of CPU resources. As indicated by the multiplier $(1-w_k)$ in Line 12, the higher the camera priority, the smaller the GPU frame rate and therefore the smaller the allocation of CPU resources.

Point Cloud Random Subsampling. For each camera 114, the encoder 116 filters and compresses the point clouds that are within the bounding box of the object detection task 514 (FIG. 5). If the filtered point cloud of camera k is greater than the corresponding limit imposed in Su, then Habbiton randomly samples $w_k \cdot N_u(i)$ points from the filtered point clouds.

GPU Sharing

ML Frequency Adaptation. The current maximum rate of frames sent to the GPU for object detection is limited by $M_u(i)$ as described in FIG. 8. The cameras that have greater FoV overlap with the user pose, capture larger point clouds, and thus incur longer CPU latency than the cameras with smaller FoV overlap. For the total frame encoding to remain within the frame latency of T=1/FPS, it is prudent to have the cameras that incur smaller CPU demands, engage in more-frequent ML object detection tasks.

The list $G_u$ from Algorithm 2 of FIG. 11 holds the ML frequency for each camera $k \in K_u$. Observe that, unlike the point-cloud size, the ML frequency is allocated according to $(1-w_k) \cdot M_u(i)$. As such, the lower the camera point-cloud size, the greater the ML frequency.

ML Bounding Box Adjustment. Habbiton uses the ML object detection and segmentation task 514 (FIG. 5) to identify a bounding box around the people in the scene. As understood by those skilled in the art, machine learning (ML) tasks, like the object detection and segmentation task 514 of FIG. 5, are executed on a GPU. In Habbiton, the object detection and segmentation task 514 is used to identify the "interesting"/important parts of the 3D scene to encode and transmit. Machine learning is a field of study in artificial intelligence concerned with the development and study of statistical algorithms that can learn from data and generalize to unseen data, and thus perform tasks without explicit instructions. If ML is performed on every frame, then the bounding box will accurately track the people as they move within the MR environment. However, due to GPU capacity limits, object detection is conducted on only a subset of the frames of each camera with higher-weighted cameras having less-frequent bounding box updates. The frames may be allocated to the GPU via uniform sampling. Assume that N frames are in the pipeline with sufficient GPU capacity for only M<N frames. This means that only M out of the N frames will be sent to the GPU. These M frames may be sampled uniformly, meaning that one out of every floor (N/M) frames is sent to the GPU.

For frames without object detection, Habbiton expands the bounding box to cover the estimated mobility of the subjects. The underlying idea is that, while Habbiton will not know the precise location of the people, the points within the expanded bounding box will still include the people moving within the MR space.

Habbiton estimates the amount of box expansion by tracking human mobility from different cameras in the subset $K_u$. For each camera in the subset, Habbiton maintains a time-limited array of frames that have been dispatched for ML processing, along with their timestamps and centroid positions. Any frame that is older than, e.g., 2 seconds is dropped from this array. Habbiton then determines the mean displacement per millisecond of the target person as measured by each camera. The final displacement is a weighted sum of displacement rates from all the cameras, with the weights determined using the dot product function from Algorithm 2 of FIG. 11. A detailed description of this estimation is shown in Algorithm 3 of FIG. 12.

Algorithm 3 expands the bounding box to track object mobility in frames that are not sent to the ML-based object-tracking processing on the GPU. $D_k$ and $T_k$ hold the most recent N positions and timestamps of object positions that have been tracked/updated by GPU ML operations. Habbiton places a bounding box over the object to denote that region of the 3D scene that is compressed and transmitted. The exact dimensions and position of the bounding box is determined by the GPU Object Detection and Segmentation task 514 of FIG. 5.

Lines 1-7 of Algorithm 3 update these arrays with the latest frame from each camera. At this point, note that the same object has been tracked by multiple cameras. Line 8 then finds the average rate of displacement of this object, using tracking information from all the cameras in the set K. In Lines 10-12, if the particular frame has been dispatched to the GPU, then the bounding box of the object is that determined by the GPU task. Otherwise, in Lines 13-19, the bounding box is expanded based on the mean displacement computed in Line 8. This will make the bounding box larger than necessary, and will thus incur greater CPU time to process, but overall compute time will still be lower than if the frame were sent to the GPU for Object Detection and Segmentation processing 514.

FIG. 13 is a simplified hardware block diagram of an edge server 1300 that can be used to implement one or more of the scene encoding subsystems 110 and one or more of the corresponding scene rendering subsystems 130 of FIG. 1. As shown in FIG. 13, edge server 1300 includes (i) communication hardware (e.g., wireless, wireline, and/or optical transceivers (TRX)) 1302 that supports communications with other edge servers, (ii) (at least one) central processing unit (CPU) 1304 and (at least one) graphics processing unit (GPU) 1306 that control the operations and perform the computations of edge server 1300, and (iii) a memory (e.g., RAM, ROM) 1308 that stores code executed by the CPU 1304 and GPU 1306 and/or data generated and/or received by edge server 1300.

As used herein and as described by heavy.ai, a CPU processor is designed to handle a wide range of tasks quickly (as measured by CPU clock speed), but is limited in the concurrency of tasks that can be running, while a GPU processor is designed to quickly render high-resolution images and video concurrently. Because GPUs can perform parallel operations on multiple sets of data, they are also commonly used for non-graphical tasks such as machine learning and scientific computation. Typically designed with thousands of processor cores running simultaneously, GPUs enable massive parallelism where each core is focused on making efficient calculations.

While GPUs can process data several orders of magnitude faster than a CPU due to massive parallelism, GPUs are not as versatile as CPUs. CPUs typically have large and broad instruction sets, managing every input and output of a computer, which a GPU cannot do. In a server environment, there might be 24 to 48 very fast CPU cores. Adding 4 to 8 GPUs to this same server can provide as many as 40,000 additional cores. While individual CPU cores are faster (as measured by CPU clock speed) and smarter than individual GPU cores (as measured by available instruction sets), the sheer number of GPU cores and the massive amount of parallelism that they offer more than make up the single-core clock speed difference and limited instruction sets. GPUs are best suited for repetitive and highly parallel computing tasks. Beyond video rendering, GPUs excel in machine learning, financial simulations, and risk modeling, and many other types of scientific computations.

Although the present disclosure has been described in the context of the Habbiton framework of FIGS. 1-13, those skilled in the art will understand that the present disclosure can also be implemented in the context of other MR telepresence applications. For example, although the Habbiton framework implements each of three different techniques that may be referred to as (i) responsive mixed-reality compute pipeline, (ii) mixed-reality camera compute framework, and (iii) mixed-reality GPU sharing framework, alternative MR telepresence applications might implement only one or only two of those techniques.

Habbiton is a novel approach to a scalable, large-scale framework for mixed-reality experiences that has flexible deployment scenarios. Although described in the context of the edge-compute solution of FIG. 1, this design is also optimal for scalable, cloud-compute MR, where all components are deployed in the cloud, with no reliance on any edge servers. This simplifies deployment and the provision of MR services for end-users. Habbiton can also be implemented using a combination of edge and cloud compute, where intelligent edge servers can serve as the scene managers, encoders, and renderers, while decoding is performed in the cloud and decoded, composite video streams 133 are streamed down to the end-users. The algorithms and techniques here can self-adapt to a large variety of deployment scenarios.

In the embodiment of FIG. 1, there is a one-to-one relationship between the cameras 114 and the encoders 116, with each encoder 116 encoding the signals from a single corresponding camera 114. In alternative embodiments, a given encoder 116 may encode the signals from two or more different cameras 114.

In certain embodiments, the present disclosure is a scene manager for a scene encoding subsystem for multi-user mixed-reality telepresence, the scene encoding subsystem comprising a plurality of cameras and at least one encoder adapted to process signals from the plurality of cameras, the at least one encoder comprising at least one central processing unit (CPU) and at least one graphics processing unit (GPU). The scene manager comprises at least one processor and at least one memory storing instructions that, upon being executed by the at least one processor, cause the scene manager at least to determine relative priorities of the cameras and allocate CPU resources and GPU resources in the at least one encoder based on the relative priorities of the cameras, wherein (i) greater CPU resources are allocated to higher priority cameras than to lower priority cameras and (ii) greater GPU resources are allocated to lower priority cameras than to higher priority cameras.

In at least some of the above embodiments, the scene manager is adapted to modify the allocations of the CPU and GPU resources in the at least one encoder over time as the determined relative priorities of the cameras change over time.

In at least some of the above embodiments, the scene manager is adapted to determine the relative priorities of the cameras based on user position and field of view of each camera wherein cameras having fields of view that capture more of the user have higher priority than cameras having fields of view that capture less of the user.

In at least some of the above embodiments, the scene manager is adapted to instruct the at least one encoder to ignore signals from at least one camera whose field of view captures none of the user.

In at least some of the above embodiments, the scene manager is adapted to instruct a GPU to skip certain frames from at least one higher priority camera.

In at least some of the above embodiments, the scene manager is adapted to instruct a CPU to process a skipped frame using a bounding-box expansion algorithm based on object motion determined using GPU object detection and segmentation processing of previous non-skipped frames.

In at least some of the above embodiments, the scene manager is adapted to allocate higher point-cloud capture densities to higher-priority cameras.

In at least some of the above embodiments, the scene manager is adapted to perform an additive increase, multiplicative decrease (AIMD) technique to allocate the CPU and GPU resources based on the determined relative priorities of the cameras.

In at least some of the above embodiments, the scene manager is adapted to multiplicatively decrease and additively increase CPU and GPU resources for a set of multiple cameras based on performance of any one camera in the set.

In at least some of the above embodiments, the scene manager is adapted to (i) receive feedback from the at least one encoder and (ii) control the processing of the at least one encoder based on the feedback.

In at least some of the above embodiments, the feedback comprises CPU and GPU processing latencies for different cameras.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A scene manager for a scene encoding subsystem for multi-user mixed-reality telepresence, the scene encoding subsystem comprising a plurality of cameras and at least one encoder adapted to process signals from the plurality of cameras, the at least one encoder comprising at least one central processing unit (CPU) and at least one graphics processing unit (GPU), the scene manager comprising:
   at least one processor; and
   at least one memory storing instructions that, upon being executed by the at least one processor, cause the scene manager at least to:
      determine relative priorities of the cameras; and
      allocate CPU resources and GPU resources in the at least one encoder based on the relative priorities of the cameras, wherein:
         greater CPU resources are allocated to higher priority cameras than to lower priority cameras; and
         greater GPU resources are allocated to lower priority cameras than to higher priority cameras.

2. The scene manager of claim 1, wherein the scene manager is adapted to modify the allocations of the CPU and GPU resources in the at least one encoder over time as the determined relative priorities of the cameras change over time.

3. The scene manager of claim 1, wherein the scene manager is adapted to determine the relative priorities of the cameras based on user position and field of view of each camera wherein cameras having fields of view that capture more of the user have higher priority than cameras having fields of view that capture less of the user.

4. The scene manager of claim 3, wherein the scene manager is adapted to instruct the at least one encoder to ignore signals from at least one camera whose field of view captures none of the user.

5. The scene manager of claim 1, wherein the scene manager is adapted to instruct a GPU to skip certain frames from at least one higher priority camera.

6. The scene manager of claim 5, wherein the scene manager is adapted to instruct a CPU to process a skipped frame using a bounding-box expansion algorithm based on object motion determined using GPU object detection and segmentation processing of previous non-skipped frames.

7. The scene manager of claim 1, wherein the scene manager is adapted to allocate higher point-cloud capture densities to higher-priority cameras.

8. The scene manager of claim 1, wherein the scene manager is adapted to perform an additive increase, multiplicative decrease (AIMD) technique to allocate the CPU and GPU resources based on the determined relative priorities of the cameras.

9. The scene manager of claim 8, wherein the scene manager is adapted to multiplicatively decrease and additively increase CPU and GPU resources for a set of multiple cameras based on performance of any one camera in the set.

10. The scene manager of claim 1, wherein the scene manager is adapted to:
   receive feedback from the at least one encoder; and
   control the processing of the at least one encoder based on the feedback.

11. The scene manager of claim 10, wherein the feedback comprises CPU and GPU processing latencies for different cameras.

12. A method for a scene manager of a scene encoding subsystem for multi-user mixed-reality telepresence, the scene encoding subsystem comprising a plurality of cameras and at least one encoder adapted to process signals from the plurality of cameras, the at least one encoder comprising at least one CPU and at least one GPU, the method comprising the scene manager:
   determining relative priorities of the cameras; and
   allocating CPU resources and GPU resources in the at least one encoder based on the relative priorities of the cameras, wherein:
      greater CPU resources are allocated to higher priority cameras than to lower priority cameras; and
      greater GPU resources are allocated to lower priority cameras than to higher priority cameras.

13. The method of claim 12, wherein the scene manager modifies the allocations of the CPU and GPU resources in the at least one encoder over time as the determined relative priorities of the cameras change over time.

14. The method of claim 12, wherein the scene manager determines the relative priorities of the cameras based on user position and field of view of each camera wherein cameras having fields of view that capture more of the user have higher priority than cameras having fields of view that capture less of the user.

15. The method of claim 12, wherein the scene manager instructs a GPU to skip certain frames from at least one higher priority camera.

16. The method of claim 15, wherein the scene manager instructs a CPU to process a skipped frame using a bounding-box expansion algorithm based on object motion determined using GPU object detection and segmentation processing of previous non-skipped frames.

17. The method of claim 12, wherein the scene manager allocates higher point-cloud capture densities to higher-priority cameras.

18. The method of claim 12, wherein the scene manager performs an AIMD technique to allocate the CPU and GPU resources based on the determined relative priorities of the cameras.

19. The method of claim 18, wherein the scene manager multiplicatively decreases and additively increases CPU and GPU resources for a set of multiple cameras based on performance of any one camera in the set.

20. The method of claim 12, wherein the scene manager:
   receives feedback from the at least one encoder; and
   controls the processing of the at least one encoder based on the feedback.

* * * * *